April 12, 1932.   M. MÜLLER   1,853,570
CAR FOR PASSENGER ROPEWAYS
Filed Sept. 12, 1928
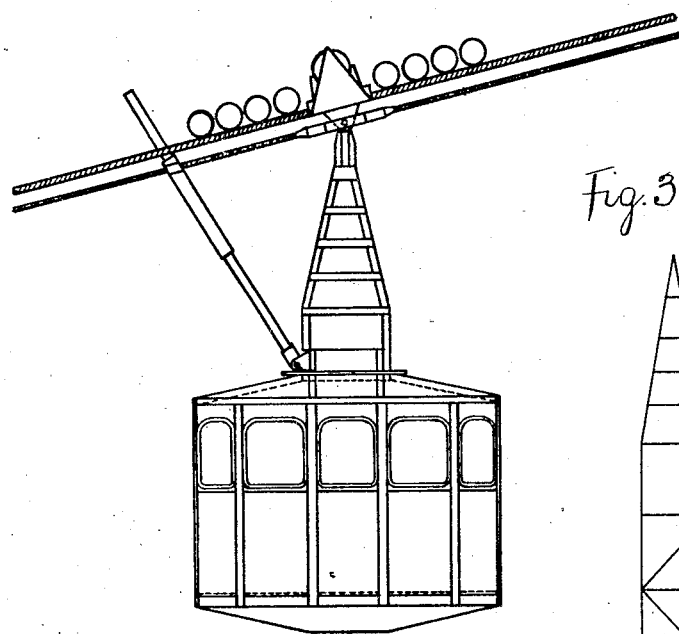
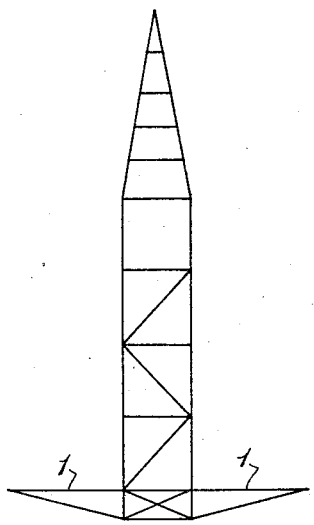
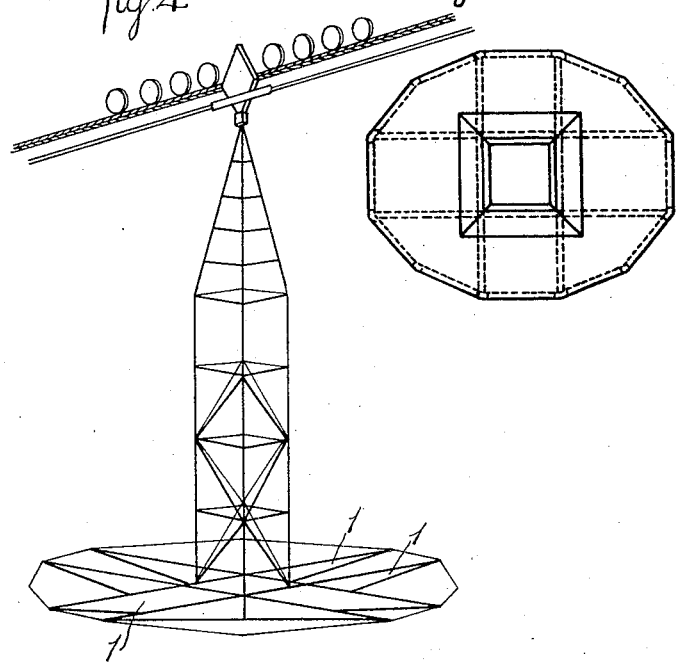

Patented Apr. 12, 1932

1,853,570

UNITED STATES PATENT OFFICE

MAX MULLER, OF LEIPZIG-REUDNITZ, GERMANY, ASSIGNOR TO THE FIRM ADOLF BLEICHERT & CO., A.-G., OF LEIPZIG, GERMANY

CAR FOR PASSENGER ROPEWAYS

Application filed September 12, 1928, Serial No. 305,531, and in Germany September 10, 1927.

The invention relates to the shape of the cars for passenger ropeways and their constructive design, the shape and constructive design being in close relationship with each other, because the solution of the constructive problem in accordance with the present invention will alone permit of obtaining the most suitable shape of car.

Various conflicting conditions have to be fulfilled by the shape of the cars for passenger ropeways, and the resulting difficulties increase with the size of the cars. Consideration for the passengers, tasteful appearance of the cars and the primary object of allowing a good view of the panorama are all factors which demand a maximum number of window seats. This could, of course, be realized by long, narrow cabins, the passengers standing in two rows along the sides, without any intervening space. In cars of such type, the size and distribution of the surfaces exposed to the wind would however be extremely unfavourable. If this alone had to be considered, spherical cabins would be the most practical, but these would never fulfill the other requirements stated above.

With the increasing size of the cars, the statical and constructive difficulties of satisfactorily fixing the cabin on the hanger increase also. The suspension must be, for various reasons, of a perfectly rigid character. It is also essential that there should be easy access on the track to the removing gear and, in particular, to the catch-device, and this can be realized to the best advantage by means of a trap-door in the roof of the car.

An embodiment of the invention is illustrated in the accompanying drawings, in which Fig. 1 is a side elevation and
Fig. 2 is a top plan view.
Fig. 3 shows in side elevation and
Fig. 4 in perspective view the frame work of the hanger with extension pieces at the lower end designed to support the floor of the car at the center.

The car, as shown in the drawings, is of frustro-cylindrical shape approximating the spherical shape. The fixation points for the hanger are not situated on the frame of the cabin as hitherto, but on a suspension to which the floor and roof of the car, i. e., the entire frame-work of the car are connected without supports. The suspension may be prismatic or cylindrical and used at the same time as an exit ladder. The suspension is closed at the lower end by a trap-door on the roof of the cabin.

The floor of the car is supported at the center only by extension pieces 1 of the hanger framework.

I claim:—

1. A car for passenger ropeways, comprising in combination a polyhedral floor, side walls, and a polyhedral roof fitted together to form a body offering small resisting surfaces to the wind on all sides and at the same time favourable space distribution.

2. A car for passenger ropeways as specified in claim 1, comprising in combination with the side walls and the roof a hanger for suspending the car, a floor, and extension pieces of the hanger construction supporting said floor at the center.

In testimony whereof I affix my signature.

MAX MULLER.